United States Patent
Hill et al.

(10) Patent No.: US 7,213,564 B2
(45) Date of Patent: May 8, 2007

(54) DIRECT INJECTION COMBUSTION CHAMBER GEOMETRY

(75) Inventors: Philip G. Hill, Vancouver (CA); Dehong Zhang, Vancouver (CA); Guowei Li, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/098,231

(22) Filed: Apr. 4, 2005

(65) Prior Publication Data

US 2006/0081212 A1  Apr. 20, 2006

Related U.S. Application Data

(63) Continuation of application No. PCT/CA03/001465, filed on Oct. 2, 2003.

(51) Int. Cl.
*F02B 3/00* (2006.01)
*F02B 23/02* (2006.01)

(52) U.S. Cl. .................. 123/298; 123/193.6; 123/299; 123/301

(58) Field of Classification Search ............. 123/193.6, 123/276, 298, 299, 301; 239/5
See application file for complete search history.

(56) References Cited

U.S. PATENT DOCUMENTS

| | | | | |
|---|---|---|---|---|
| 1,341,478 A * | 5/1920 | Platt et al. ................. | 123/298 |
| 2,118,319 A * | 5/1938 | Maynard .................... | 123/276 |
| 2,662,510 A * | 12/1953 | French ........................ | 123/276 |
| 3,039,445 A * | 6/1962 | Crowther et al. ............ | 123/276 |
| 3,253,584 A * | 5/1966 | Traub et al. ................. | 123/276 |
| 3,295,506 A * | 1/1967 | Wisniowski ................. | 123/276 |
| 4,444,166 A * | 4/1984 | Kovacs et al. .............. | 123/298 |
| 4,846,126 A * | 7/1989 | Stannard ..................... | 123/298 |
| 4,898,126 A | 2/1990 | Merritt | |
| 5,136,994 A * | 8/1992 | Gale ........................... | 123/276 |
| 5,357,924 A * | 10/1994 | Onishi ........................ | 123/276 |
| 5,613,471 A | 3/1997 | Yaoita | |
| 6,739,308 B1 * | 5/2004 | Curtis ......................... | 123/276 |
| 7,011,070 B2 * | 3/2006 | Hill et al. ................... | 123/298 |

FOREIGN PATENT DOCUMENTS

| | | | |
|---|---|---|---|
| CH | 293773 | 10/1953 | |
| DE | 3402968 A1 * | 8/1985 | ............... 123/276 |
| DE | 3510076 A1 * | 10/1986 | |
| DE | 3701722 A1 | 8/1988 | |
| DE | 3901183 A1 | 6/1990 | |

(Continued)

*Primary Examiner*—T. M. Argenbright
(74) *Attorney, Agent, or Firm*—McAndrews, Held & Malloy, Ltd.

(57) ABSTRACT

An obstruction is employed in a combustion chamber of an internal combustion engine. The obstruction is located within the chamber to generate turbulence and break-up or disrupt the soot rich zone within a directly injected quantity of fuel that is burning. More specifically, a ring disrupts fuel jets directly injected into the combustion chamber that impact on or are influence by the ring. The ring can be suspended from the piston or from the fire deck. Post-type obstructions help generate turbulence and are also targeted at disrupting the soot rich zone of the burning fuel jets. A method involves disrupting the soot rich zone or reducing soot generated within the combustion chamber and increasing burn rate by impacting the fuel jets on an obstruction within the chamber.

17 Claims, 6 Drawing Sheets

FOREIGN PATENT DOCUMENTS

| | | | |
|---|---|---|---|
| DE | 3939251 A1 | 5/1991 | |
| EP | 0249699 A2 | 4/1987 | |
| EP | 0727571 A1 | 2/1996 | |
| JP | 53-32212 A * | 3/1978 | ................ 123/276 |
| JP | 57-8314 A * | 1/1982 | ................ 123/276 |
| JP | 58035272 | 3/1983 | |
| JP | 60132022 | 7/1985 | |
| JP | 62-75022 A * | 4/1987 | .............. 123/193.6 |
| JP | 62178716 | 8/1987 | |
| JP | 01147116 | 6/1989 | |
| JP | 6-17651 A * | 1/1994 | ................ 123/299 |
| JP | 07133723 | 5/1995 | |
| JP | 07293250 | 11/1995 | |
| JP | 08254124 | 10/1996 | |
| JP | 09088609 | 3/1997 | |

* cited by examiner

DIRECT INJECTION COMBUSTION CHAMBER GEOMETRY

CROSS-REFERENCE TO RELATED APPLICATION(S)

This application is a continuation of International Application No. PCT/CA2003/001465, having an international filing date of Oct. 2, 2003, entitled "Direct Injection Combustion Chamber Geometry". International Application No. PCT/CA2003/001465 claimed priority benefits, in turn, from Canadian Patent Application No. 2,406,209 filed Oct. 2, 2002. International Application No. PCT/CA2003/001465 is also hereby incorporated by reference herein in its entirety.

FIELD OF THE INVENTION

This invention relates to a method and apparatus for reducing particulates generated during a combustion event within the combustion chamber of an internal combustion engine.

BACKGROUND OF THE INVENTION

Advantages of high efficiency and high torque at low speed are realized by rapid near-top-dead-center injection of fuel jets. Such direct injection creates its own turbulence, burning at a characteristically turbulence-limited combustion rates. Diesel engines operate using this strategy.

A disadvantage of conventional diesel engines is the tendency to produce soot as a result of incomplete oxidation of the fuel. In this disclosure, the term "soot" includes particulate matter generally. Another tendency is to produce excessive nitrogen oxides (NOx) due to diffusion combustion—the mode by which directly injected diesel fuel burns. Diffusion combustion takes place near the stoichiometric temperature. Higher temperature tends to form more NOx.

Further, it has long been known that measures that tend to reduce the production of NOx also tend to increase the production of soot and vice versa. However, if soot production could be inhibited, the production of NOx could also be reduced. Moreover, soot reduction should also increase power density.

A related issue that impacts on soot formation and the flexibility of managing NOx in diesel engines relates to partial re-circulation of exhaust gas (EGR). EGR helps to reduce combustion temperature and, as a result, NOx. The reduction of combustion temperature, however, adversely impacts soot formation. Further, experimental measurements indicate that EGR also tends to reduce burning rate. Incomplete combustion resulting from EGR reduces the efficiency of the engine overall. Therefore, as soot production and incomplete combustion limit the extent to which EGR can be utilized, the advantages of increasing the combustion rate and the soot oxidation rate are apparent.

Developments in engine technology have shown that diesel engines can be fuelled by gaseous fuels. Some of these developments show that this can be done with no real impact on power and/or efficiency. Examples of such gaseous fuels include natural gas, methane, propane, ethane, gaseous combustible hydrocarbon derivatives and hydrogen.

Natural gas will be discussed in the context of this disclosure however, as would be understood by a person skilled in the art, the other gaseous fuels noted may be adapted. Substituting diesel with such natural gas results in emissions benefits over diesel. Specifically, lower NOx and soot levels are found in the exhaust gas.

A method used to ensure that natural gas matches, for the most part, the power and efficiency found in diesel-fueled ignition engines, relies on high-pressure direct injection followed by diffusion combustion. That is, natural gas is directly injected at high pressure into a combustion chamber where an ignition source is usually used to ignite the natural gas. Due to such direct injection and diffusion combustion, this fuel generally suffers from the same issues noted above in regards to soot and NOx generation, albeit at significantly lower levels than is the case with diesel fuel. The same zone of incomplete oxidation found in regards to combustion resulting from diesel-fuelled compression ignition strategies is thought to result. As such, while natural gas provide a significant reduction of particulates and NOx, these fuels, directly injected, are governed by some of the same physical processes found in diesel-fuelled engines. Therefore, room is available to manage soot and particulate production in both natural gas and diesel-fuelled direct injection engines.

Dec, J. E., "A Conceptual Model of DI Diesel Combustion based on Laser-Sheet Imaging", SAE 970873, 1997 provided a physical understanding of conventional diesel fuel combustion for the quasi-steady period of burning. It appears that combustion takes place in two phases. The first occurs in the rich mixture created by entrainment of air into the fuel jet. Here the equivalence ratio is so high that the flame temperature is low (perhaps around 1600° K) and soot forms by pyrolysis due to the shortage of oxygen. A soot-rich zone is created that is surrounded by a thin region in which final mixing and any remaining chemical reactions occur. Understanding the behavior of this soot rich zone provides a starting point for reducing the production of soot in the diesel and natural gas engines described above.

Sjoeberg, in "The Rotating Injector as a Tool for Exploring DI Diesel Combustion and Emissions Formation Processes", 2001, ISSN 1400-1179, provided a rotating injector that, in effect, caused turbulence that impacted on the soot-rich zone by moving the fuel jet throughout the combustion chamber. Such a strategy, however, is difficult to implement. A rotating injector introduces moving parts to the engine that are susceptible to wear and durability issues.

The present invention deals with the above noted problems related to directly injected fuels used in internal combustion engines.

SUMMARY OF THE INVENTION

The present invention introduces combustion chamber geometry directed at interfering with directly injected fuels to help reduce the net rate of soot formation resulting with directly injected fuels. The geometry introduces a structure designed to "break up" the soot rich zone found where a directly injected quantity of fuel is introduced into a combustion chamber and also to creates turbulence to aid in the soot oxidation process.

One aspect of the invention provides a method of reducing soot generated by the combustion of a fuel that is directly injected into a combustion chamber of an internal combustion engine. The method includes drawing an intake charge into the combustion chamber during an intake stroke of a piston of an internal combustion engine. The piston partially defines the combustion chamber. The intake charge is compressed during a compression stroke of the piston. Fuel is then directly injected into the combustion chamber as a fuel jet. The fuel jet is ignited and burned with the combustion chamber and directed at or onto an obstruction within the combustion chamber.

In preferred embodiments, the obstruction interrupts the soot rich zone within the fuel jet by impacting the fuel jet on the obstruction.

The obstruction may comprise a ring. In some embodiments the ring is suspended from a fire deck. The fire deck may partially define the combustion chamber. The ring may be centered around the injector. In some embodiments the ring is suspended from the piston. The ring may be a glow ring. The obstruction may comprise one or more posts.

In some embodiments of the invention, turbulence is generated within the combustion chamber by providing a post suspended from the fire deck.

The fuel jet may be directed to cause an increase in the $O_{S_A}:S_V$ ratio.

The fuel may be a gaseous fuel. The fuel may. comprise natural gas.

The obstruction may also serve as an ignition assist.

A further aspect of the invention provides an internal combustion engine comprising a cylinder, a piston disposed in the cylinder where the piston is oscillating between top dead center and bottom dead center in the combustion chamber during operation of the engine. The engine has a fire deck. The fire deck, cylinder, the piston defines a combustion chamber. An intake valve and exhaust valve are also included. A fuel injector capable of directly injecting a fuel as a fuel jet into the combustion chamber is included along with an obstruction suspended within the combustion chamber. The obstruction should be placed so as to interfere with the fuel jet. The obstruction may comprise a ring that may be suspended from the piston or fire deck and may be centered around the injector. The obstruction may also comprise a post or several posts suspended from the fire deck. The posts may be located to generate turbulence to interfere with the fuel jets.

The fuel of the engine of the subject invention may be natural gas that is ignition assisted by a glow plug. The obstruction may also be a glow ring or hot surface for assisting ignition.

A further aspect of the invention provides an obstruction configured to interfere with burning fuel jets in a combustion chamber. The obstruction defines a reservoir and a orifice where the orifice is capable of generating turbulence in the combustion chamber by directing a charge jet from the reservoir into the combustion chamber during the power stroke of the piston. That same obstruction with the charge may also provide an ignition assist to the system.

Further aspects of the invention and features of specific embodiments of the invention are described below.

BRIEF DESCRIPTION OF THE DRAWINGS

In drawings which illustrate non-limiting embodiments of the invention:

FIGS. 2a and 2b show two views of the combustion chamber of a first embodiment of the subject invention wherein an obstruction is affixed to the fire deck of the combustion chamber.

FIGS. 3a and 3b show two views of the combustion chamber demonstrating a variation of the first embodiment of the subject invention wherein an obstruction is affixed to the fire deck of the combustion chamber.

FIG. 4 shows a close-up cross-sectional view of half of the combustion chamber referring to FIG. 3b across line B—B from FIG. 3a.

FIGS. 6a and 6b show two views of the combustion chamber demonstrating a second embodiment of the subject invention wherein an obstruction is affixed to the piston disposed in the combustion chamber.

FIGS. 7a and 7b show two views of the combustion chamber demonstrating a third embodiment of the subject invention wherein post obstructions are affixed to the fire deck of the combustion chamber.

DETAILED DESCRIPTION OF PREFERRED EMBODIMENT(S)

In the present invention, combustion chamber geometry is provided to physically interfere with a quantity of either a gaseous or liquid fuel, directly injected into a combustion chamber of an internal combustion engine.

Figure 1:
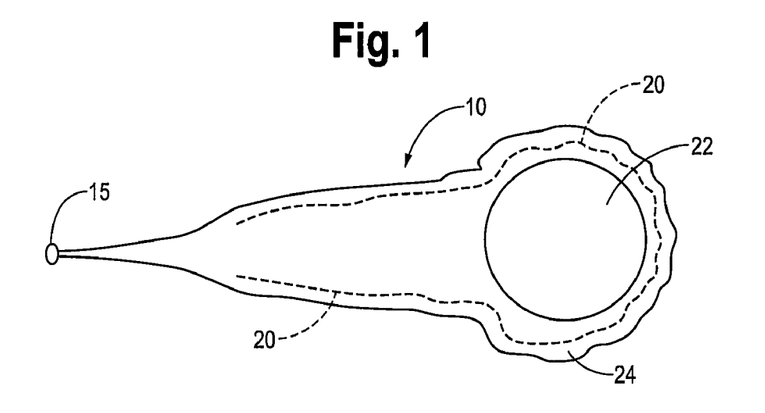
FIG. 1 shows a cross-sectional profile of a directly injected jet of fuel during combustion of the jet demonstrating the prior art understanding as to how and where soot is accumulated within a fuel jet.

Referring to FIG. 1, the prior art understanding as to how and where soot is accumulated within a fuel jet is shown. Fuel jet 10 is injected through injector hole 15 into an isolated environment with little turbulence. Here the fuel jet has been ignited and is burning after being injected into an environment conducive to the ignition and combustion of the chosen fuel. Soot oxidation zone 20 and soot rich zone 22 are shown where combustion zone 24 is partially defined on one side by soot oxidation zone 20.

The ignition and combustion environment is generated, in general, when a charge has been drawn into a combustion chamber and compressed during the compression stroke of the engine. Depending on the fuel, some type of ignition assist may be necessary such as a glow plug or pilot fuel or other ignition assist known to persons skilled in the art. Such an ignition assist is generally needed if natural gas is the fuel. In general, this will be referred to as the ignition environment established within the combustion chamber specific to the chosen fuel whether it be assisted or result from the properties of the intake charge alone.

Referring to FIG. 1, during combustion a directly injected jet of fuel will burn in combustion zone 24, which is defined by the boundary layer between fuel jet 10 and the surrounding combustion environment. Interfaced along this zone is a soot oxidation zone 20, which surrounds soot rich zone 22. Soot rich zone 22 is an area of inadequate mixing of fuel and air wherein particulates form and cumulate. This relatively large zone 22, if deprived of oxygen, will tend to expel the soot created here into the exhaust system. The soot may include particulate matter generated in the combustion chamber during combustion of the fuel.

When an obstruction within the combustion chamber interferes with one or more fuel jets, it breaks up the soot rich zone causing oxygen to mix with this soot rich zone and reducing the propensity to generate soot emissions. Such obstructions cause the ratio of the surface area of the oxidation zone ($O_{SA}$) to the volume of the soot rich zone ($S_V$) (the $O_{SA}$:$S_V$ ratio) to increase by interfering with the soot rich zone. Therefore, the quantity of particulates expelled into the exhaust system is reduced.

The embodiments discussed below provide a combustion chamber partially defined by a piston oscillating between top dead center and bottom dead center within a cylinder when the engine is in operation. During operation, an intake charge is drawn into the combustion chamber through an intake valve during the intake stroke. This same charge is then compressed during the compression stroke. An ignition environment is then established within the combustion chamber at or near the completion of the compression stroke. As noted above, in all embodiments an ignition environment that may include pilot or hot surface induced ignition. As is often the case with gaseous-fuelled diesel-stroke engines, the environment created within the intake charge alone, that is, the temperature and/or pressure of that charge, is not sufficient to result in ignition of the fuel. As such, the ignition environment may be supplemented, for example, by ignition of a small amount of relatively easily auto-ignitable fuel or by the placement of a glow plug in the combustion chamber. Such ignition assists, along with the intake charge, are encompassed in the discussion of an ignition environment within the combustion chamber. In any event, the embodiments suppose the fuel in question is ignited after it is directly injected into the combustion chamber.

All embodiments consider engines using both directly injected gaseous and directly injected diesel or other liquid fuels.

In general, all the embodiments show physical structures within the combustion chamber that are positioned to help generate interference between the injected fuel jets once ignited and the obstruction. Specifically, the obstruction interferes with or breaks-up the soot rich zone.

Considering two variations of the first embodiment of the invention described below and in FIGS. 2 through 5, an obstruction is attached to the fire deck.

Figure 2A:
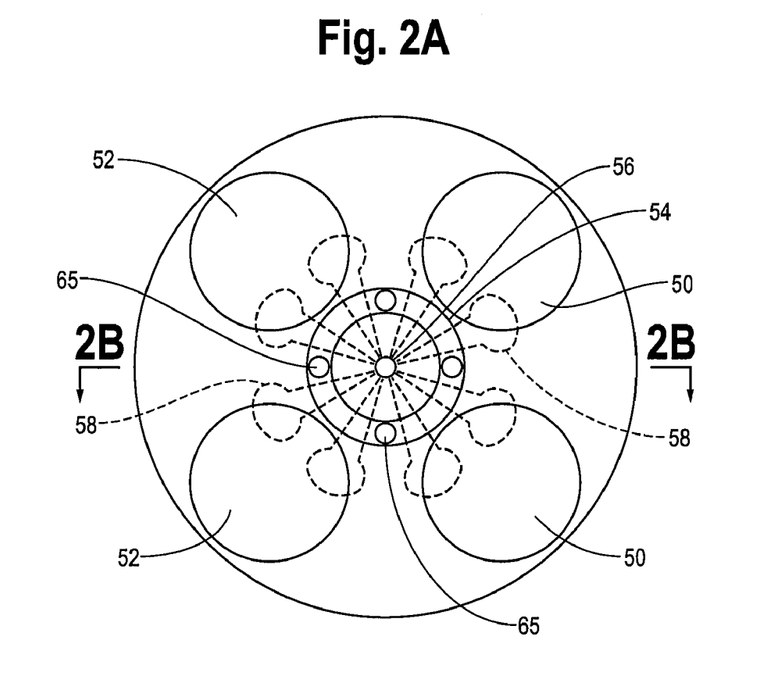
FIG. 2a shows a top view of the combustion chamber demonstrating the subject geometry.
Figure 2B:
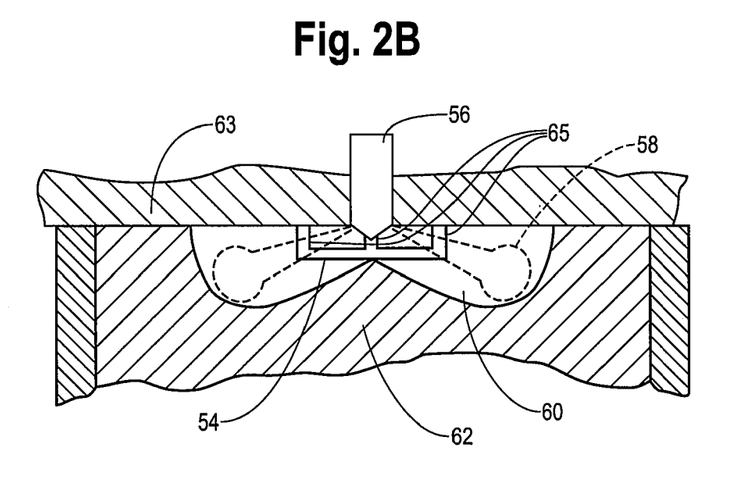
FIG. 2b shows a cross-sectional view of the combustion chamber across line A—A, referring to FIG. 2a, demonstrating the subject geometry and its attachment to the fire deck.

Referring to FIGS. 2a and 2b, a top view and cross sectional view of a first embodiment of the subject invention is shown. Intake valves 50 and exhaust valves 52, ring 54, injector 56 and fuel jets 58 are also shown. Generally combustion chamber 60 and piston 62 are also provided where piston 62 is at top dead center. Fire deck 63 is also shown along with posts 65.

Figure 3A:
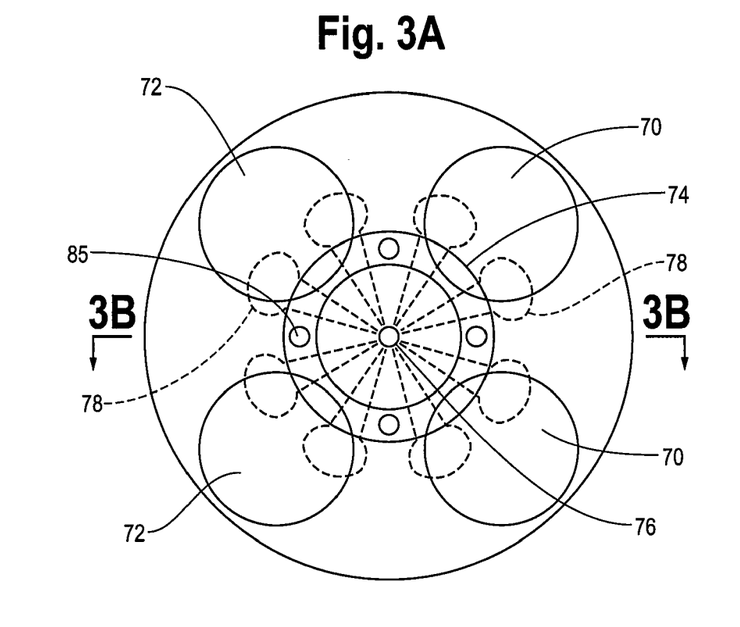
FIG. 3a shows a top view of the combustion chamber demonstrating the subject geometry of this embodiment.
Figure 3B:
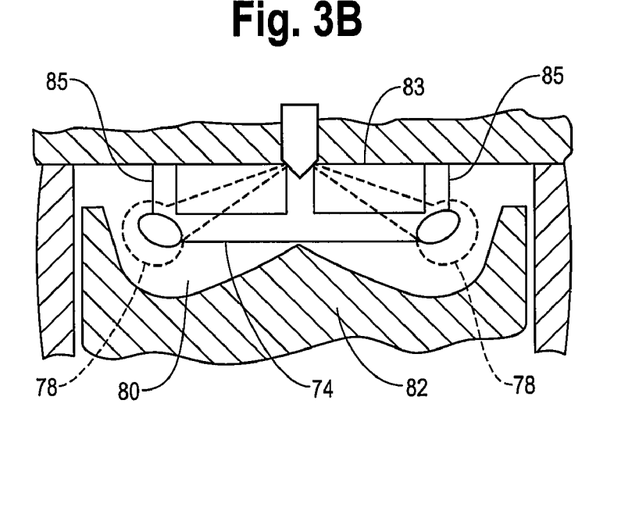
FIG. 3b shows a cross-sectional view of the combustion chamber across line B—B, referring to FIG. 3a, demonstrating the subject geometry and attachment to the fire deck of this embodiment.

Referring to FIGS. 3a and 3b, a top and cross-sectional view of a variation of the first embodiment is provided wherein the obstruction is affixed to fire deck 83. Intake valves 70, exhaust valves 72, ring 74, injector 76 and fuel jets 78 are also shown. Combustion chamber 80 and piston 82 are again shown when the piston is at top dead center. Posts 85 are provided.

Figure 4:
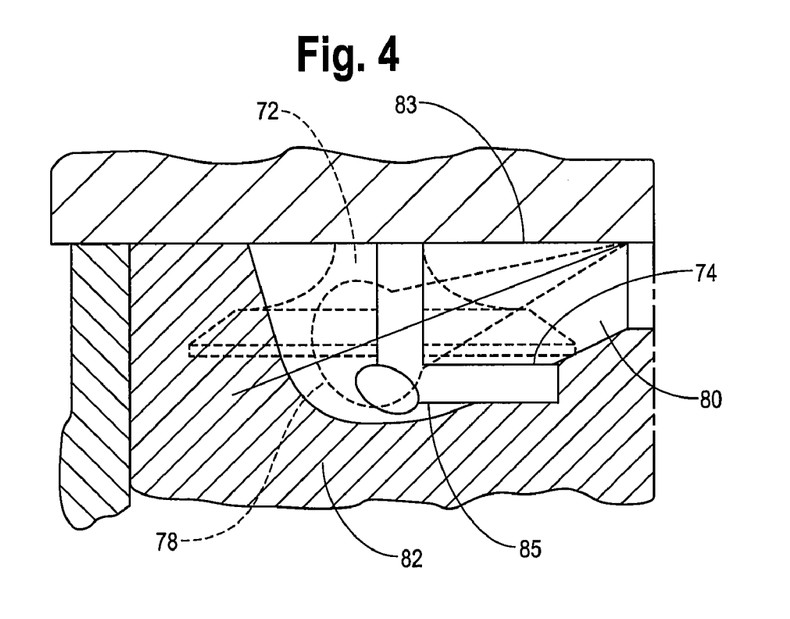

Referring to FIG. 4, a close-up of the cross-section of one quadrant of combustion chamber 80 is provided with an outline of exhaust valve 72 shown in an open position as it would appear near or at the commencement of the intake stroke of piston 82. Fuel jet 78 and ring 74 are shown with piston 82 at top dead center.

Figure 5:
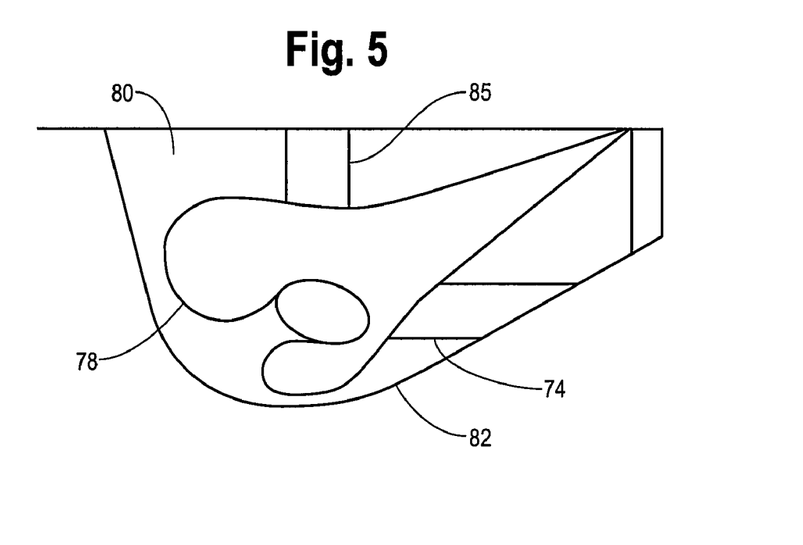
FIG. 5 shows a cross-sectional view of half of the combustion chamber across line B—B of FIG. 3a outlining the impact of the variation of the first embodiment of the subject invention on the fuel jet.

Referring to FIG. 5, the influence of ring 74 is shown, as an example, "breaking-up" one fuel jet 78.

Note that in all figures, the fuel jet is shown in that absence of the obstruction that is the subject of the present invention. The obstruction is superimposed, demonstrating the interference to be generated by the obstruction.

Referring to the two variations of the first embodiment shown in FIGS. 2a through 5, the obstruction consists of rings 54 and 74 affixed to fire decks 63 and 83, pistons 62 and 82 partially defining combustion chambers 60 and 80. The diameter of each of the rings and the distance it is positioned from the fire deck allow ring to interfere with each fuel jet. The difference between the two embodiments is that the diameter of ring 54 is smaller than the diameter of ring 74. As such, the corresponding distance of ring 54 from fire deck 63 is adjusted as compared to ring 74 and fire deck 83 in order to provide turbulence by the interference of the two rings.

By way of example, the relative dimension ranges of the ring of the embodiment provided in FIG. 2a and 2b may be provided by:

$D=(0.2–0.35)*B$ $d=(0.1–0.25)*B$ $h=(0.01–0.1)*B$ where D is the outer diameter of the ring and d the inner diameter of the ring, h is height of the supporting posts, and B is the diameter of the cylinder. For FIG. 3a and 3b the following dimension range is illustrative:

$D=(0.45–0.95)*B$ $d=(0.35–0.85)*B$ $h=(0.1–0.2)*B$

The two rings shown in FIGS. 2a, 2b, 3a, 3b, and 4 provide flexibility considering the exhaust and intake valves found in each embodiment. The embodiment provided in FIGS. 3a and 3b needs to be positioned from the fire deck to allow clearance for exhaust valves 72 and intake valves 70 when these valve are opened. See also FIG. 4. This restriction however, may be offset by the benefit of introducing a larger interference area closer to the soot rich zone. Alternatively, referring to FIGS. 2a and 2b, ring 54 can be provided at an outside diameter that it clears intake and exhaust valves 50 and 52 providing greater flexibility regarding the displacement of ring 54 from fire deck 63.

Referring to FIG. 5, fuel jet 78 is pulled over and around ring 74 increasing the area of the soot oxidation zone formed by uninterrupted direct injection alone which causes a corresponding increase in the $O_{SA}$:$S_V$ ratio.

Figure 6A:
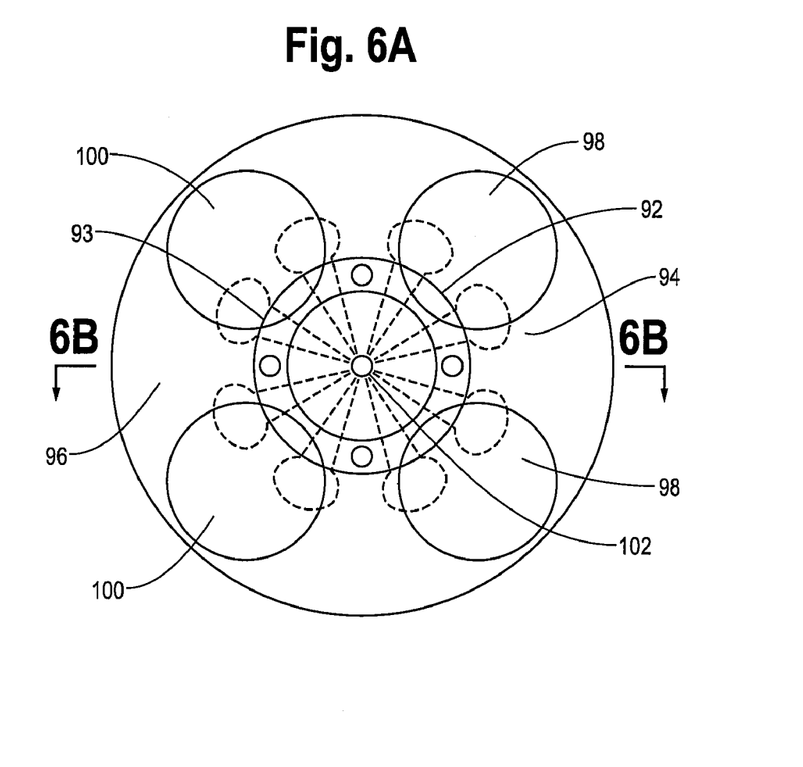
FIG. 6a shows a top view of the combustion chamber demonstrating the subject geometry of the second embodiment.
Figure 6B:
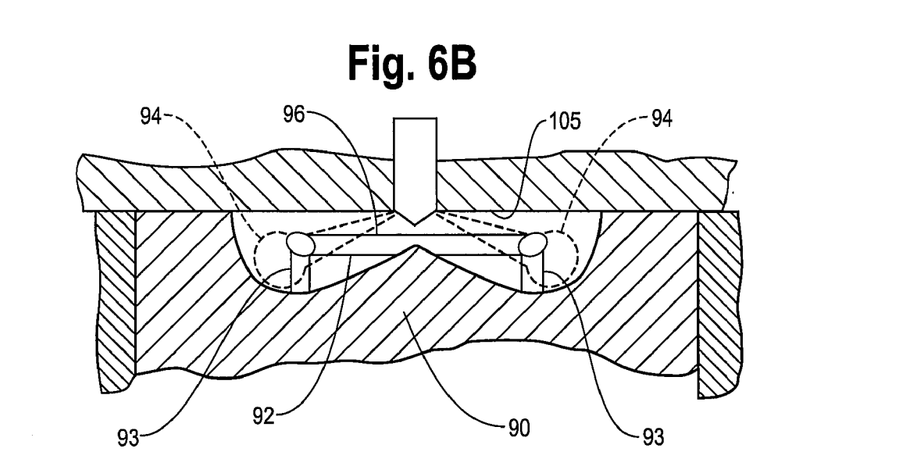
FIG. 6b shows a cross-sectional view of the combustion chamber across line C—C, referring to FIG. 6a, demonstrating the subject geometry and attachment to the piston of the second embodiment.

Referring to FIGS. 6a and 6b, a second embodiment of the subject invention is provided wherein an obstruction is affixed to a piston. This embodiment shows combustion chamber 96 with piston 90 including, affixed to it, ring 92 and posts 93. Again fuel jet 94. is outlined being injected into combustion chamber 96 defined by piston 90 at top dead center to demonstrate how the obstruction, ring 92, would interfere with fuel jets. Intake valves 98 and exhaust valves 100 are also shown with injector 102 represented.

This second embodiment of the subject invention varies from the first as it provides a structure or obstruction, in this example, ring 92, affixed to piston 90 rather than the fire deck. Therefore, ring 92 interferes with the directly injected fuel so long as the fuel is directly injected when the piston is at or near top dead center when the ring is positioned to interfere with jets 94. It is preferred that the fuel jet be injected when the ring, and consequently, the piston, is at or near top dead center.

The advantage of this embodiment is that it moves the ring within the piston creating additional turbulence as the piston moves away from the fire deck during the power stroke pulling through soot rich zone 22. This embodiment is less sensitive to the clearance needed for the intake and exhaust valves as these tend to be closed when the piston is at top dead center (that is, where the ring is at its closest approach to those valves).

By way of example, the relative dimension ranges of the ring of the embodiment provided in FIGS. 6a–6b may be provided by:

$$D=(0.45-0.95)*B$$

$$d=(0.35-0.85)*B$$

$$h=(0.02-0.2)*B$$

again, where D is the outer diameter of the ring and d the inner diameter of the ring, h is height of the supporting posts, and B is the diameter of the cylinder.

Where a ring is utilized in the subject invention (FIGS. 2a through 6b), the jet momentum impinges directly on the ring, breaking up the oxygen-deficient region and generating turbulence in the wake of the ring. Posts 65, 85 and 93 will also have some influence. While they will interact in only a minor way with the jet momentum, they will interact in more significantly within the engine with swirl. These posts interact with the burning fuel jets at a fairly early stage. The beneficial effects of the posts may be increased with an increase in fuel jet injection pressure.

The ring of the first two embodiments has the advantage of interfering with all fuel jets provided by the injector. As is usually the case, the fuel injector injects fuel into combustion chamber through several holes distributed around the injector tip. Each of these holes forces a fuel jet into the chamber resulting in a number of fuel directed throughout the combustion chamber. Therefore, a ring, centered approximately around the injector tip as provided for in these embodiments, allows each jet to be affected by the obstruction.

Figure 7A:
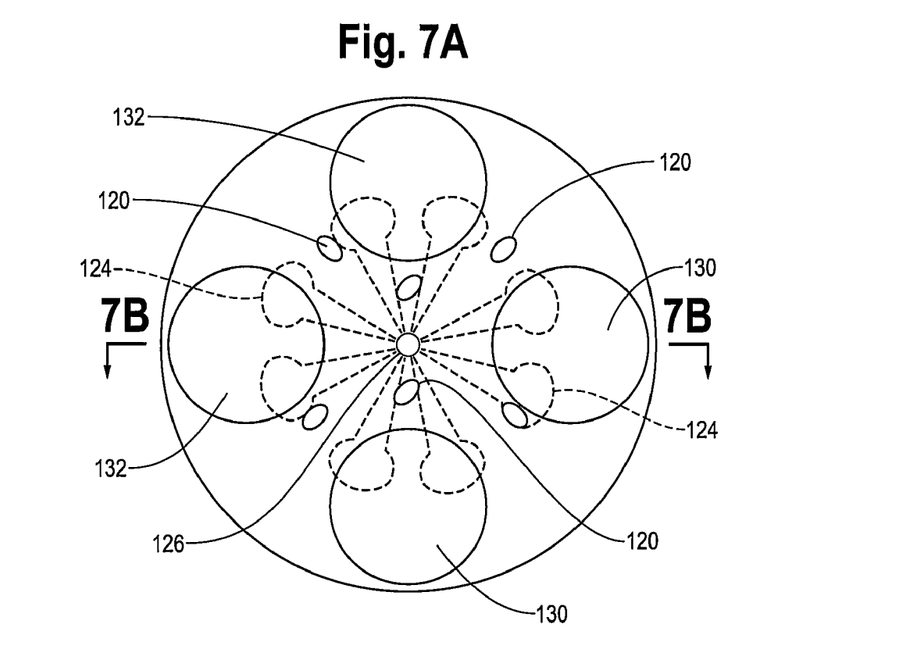
FIG. 7a shows a top view of the combustion chamber demonstrating the subject geometry of the fourth embodiment.
Figure 7B:
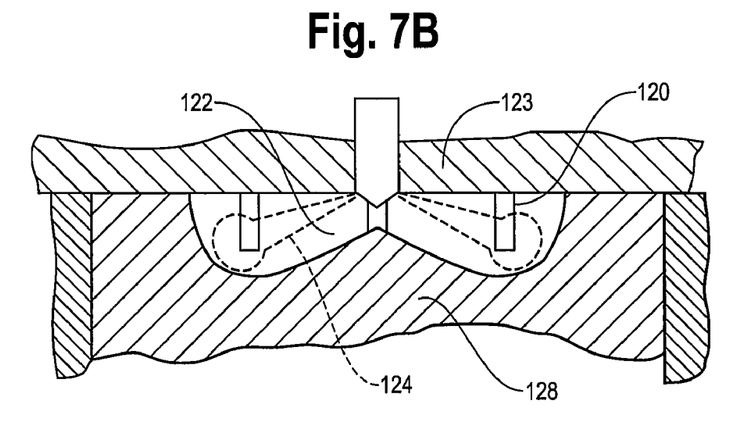
FIG. 7b shows a cross-sectional view of the combustion chamber across line D—D, referring to FIG. 7a, demonstrating the subject geometry of the third embodiment.

Other obstructions should help interfere with the soot zone increasing the OSA:SV ratio. FIGS. 7a and 7b shows a further example with an alternate embodiment of the subject invention for use with swirling combustion. Posts 120 are provided in combustion chamber 122. Again fuel jets 124, injector 126 and piston 128 are provided along with intake valves 130 and exhaust valves 132.

Figure 8:
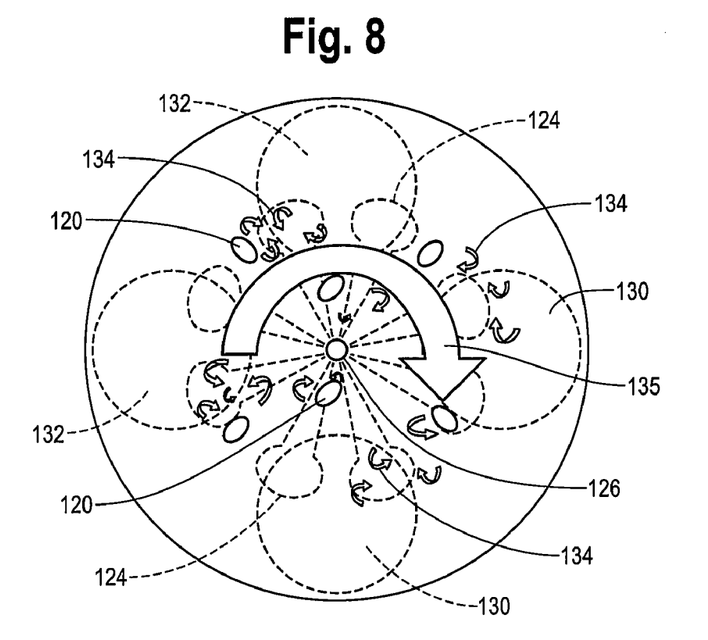
FIG. 8 shows a top view of the third embodiment of the subject invention wherein turbulence within the combustion chamber due to the obstructions is approximated when the piston is at or near top dead center.

Referring to FIG. 8, which indicates substantial gross swirling motion 135, obstruction posts 120 are distributed throughout the combustion chamber suspended from fire deck 123. These posts, as noted above, are distributed to work with a bowl shape found for the piston designed to generate currents and eddies throughout combustion chamber 122. This is demonstrated by flow lines 134 as a result of the physical presence of the posts interfering with the swirling motion 135. That is, as noted above in regards to the posts used to suspend ring 54, 74 and 92, the effect of the posts is to create mixture turbulence, as well as to break up soot formation zones which may impinge on these posts. This reduces the likelihood that soot will form within jets 124 and be expelled into the exhaust system. Such posts 120, in conjunction with or without bowl geometry, create turbulence that distorts and breaks-up jets 124.

As understood by a person skilled in the art, there is considerable freedom for radial location, cross-sectional shape and length of posts 120. Also, it is preferable that a few posts be distributed throughout combustion chamber in order to generate turbulence. A single or a very few posts will likely generate some turbulence, however, more turbulence would likely be desirable.

Other obstructions can be utilized within the combustion chamber positioned, in general on the piston or fire deck.

The obstructions are not limited to the three preferred embodiments disclosed above. The obstructions should interfere with the directly injected jet and provide additional turbulence to help break up the soot rich zone. By way of example, the injector could be boxed in by a perforated structure that would obstruct the flow of fuel jets.

The three embodiments, and any other obstructions, require high temperature materials whose use is well known to person skilled in the art as related to other internal combustion engine applications, for example, glow plug shield materials.

Further, the energy stored in the high temperature structure may also appreciably enhance the ignition of the fuel jets. For example if the fuel is natural gas which, consequently, requires a relatively high temperature environment for ignition, a carefully selected material for use for the posts or the ring may be used to assist heating such environment. The material can act as a passive glow ring that retains heat generated during previous combustion events to provide a combustion chamber more conducive to fuel ignition thereby assisting in igniting the fuel used to drive the engine. By way of example, such materials include high temperature steels or ceramics. Catalytic coating of the surface of the ring and/or posts may be used to promote ignition.

It would be appropriate to fasten the obstruction using screws or welding or other methods, as would be understood by a person skilled in the art.

Also, a reservoir within the ring with an orifice for providing fluid communication between the reservoir and combustion chamber can be provided. The orifice would allow for a quantity of an intake charge to accumulate within the reservoir during the compression stroke. During the power stroke, this quantity of charge could be ejected from the reservoir through the orifice and into the combustion chamber by the pressure gradient established between the reservoir and combustion chamber. The orifice is dimensioned to restrict flow thus setting up the pressure gradient. If this "charge jet" is directed at or out of the soot rich zone, additional turbulence can be created to break-up this zone and increase the $O_{SA}:S_V$ ratio.

While the disclosure focuses on four-stroke engine, as would be understood by a person skilled in the art, the use of an obstruction could be adapted to a two-stroke engine.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of reducing soot generated by the combustion of a gaseous fuel directly injected into a combustion chamber of an internal combustion engine, said method comprising:
   (a) drawing an intake charge into said combustion chamber during an intake stroke of a piston, said piston partially defining said combustion chamber;
   (b) compressing said intake charge during a compression stroke of said piston;
   (c) directly injecting said gaseous fuel as a plurality of fuel jets towards spatially distinct locations throughout said combustion chamber;
   (d) igniting and burning said plurality of fuel jet, said plurality of fuel jets each defining a scan rich zone and an oxidation zone during burning; and
   (e) directing said soot rich zones onto an obstruction within said combustion chamber such that a ratio of a surface area of said oxidation zone against a volume of said soot rich zone increases during burning of said plurality of fuel jets.

2. The method of claim 1 wherein said obstruction is a ring.

3. The method of claim 2 wherein said ring is suspended from a fire deck, said fire deck partially defining said combustion chamber.

4. The method of claim 3 further comprising generating turbulence within said combustion chamber with a post, said post used to suspend said ring from said fire deck.

5. The method of claim 3 wherein said ring is centered on a fuel injector, said fuel injector providing said fuel jet to said combustion chamber.

6. The method of claim 2 wherein said ring is suspended from said piston wherein said fuel is directly injected into said combustion chamber when said piston is at or near top dead center.

7. The method of claim 1 wherein said obstruction is at least one post.

8. The method of claim 3 wherein said ring is a glow ring.

9. The method of claim 1 wherein said fuel is natural gas.

10. The method of claim 1 wherein igniting said fuel is assisted by heat retained in said obstruction.

11. An internal combustion engine, comprising:
    (a) a cylinder of diameter (B);
    (b) a piston disposed in said cylinder, said piston oscillating between top dead center and bottom dead center in a combustion chamber during operation of said engine;
    (c) a fire deck, said cylinder, said piston and said fire deck defining said combustion chamber;
    (d) an intake valve and an exhaust valve;
    (e) a fuel injector capable of directly injecting a fuel as a plurality of fuel jets into said combustion chamber;
    (f) a ring with an outer diameter (D) and an inner diameter (d) suspended with said combustion chamber and positioned to interfere with said fuel jets;
    (g) a post of height (h) suspending said ring within said combustion chamber; and wherein $h=(0.01 \text{ to } 0.2) \times B$.

12. An internal combustion engine according to claim 11, wherein said ring is suspended from said fire deck.

13. An internal combustion engine according to claim 11, wherein $h=(0.01 \text{ to } 0.1) \times B$ and wherein at least of the following relationships also applies: $D=(0.2 \text{ to } 0.35) \times B$ and $d=(0.1 \text{ to } 0.25) \times B$.

14. An internal combustion engine according to claim 11, wherein $h=(0.01 \text{ to } 0.2) \times B$ and at least one of the following relationships is also applies: $D=(0.45 \text{ to } 0.95) \times B$ and $d=(0.35 \text{ to } 0.85) \times B$.

15. An internal combustion engine according to claim 11, wherein said ring is suspended from said piston.

16. An internal combustion engine according to claim 11, wherein $h=(0.02 \text{ to } 0.2) \times B$ and at least one the following relationships is also applies: $D=(0.45 \text{ to } 0.95) \times B$ and $d=(0.35 \text{ to } 0.85) \times B$.

17. An internal combustion engine according to claim 11, wherein said fuel is a gaseous fuel.

* * * * *